US008978495B2

(12) United States Patent
Hsu et al.

(10) Patent No.: US 8,978,495 B2
(45) Date of Patent: Mar. 17, 2015

(54) SYNCHRONOUS MOVEMENT-AID DEVICE FOR SLIDE MODULE

(75) Inventors: An Szu Hsu, New Taipei (TW); Way Han Dai, New Taipei (TW); Hsiu Fan Ho, New Taipei (TW)

(73) Assignee: First Dome Corporation, New Taipei (TW)

( * ) Notice: Subject to any disclaimer, the term of this patent is extended or adjusted under 35 U.S.C. 154(b) by 314 days.

(21) Appl. No.: 13/345,790

(22) Filed: Jan. 9, 2012

(65) Prior Publication Data

US 2013/0174681 A1 Jul. 11, 2013

(51) Int. Cl.
*F16H 21/16* (2006.01)
*F16H 21/04* (2006.01)
*F16H 37/12* (2006.01)

(52) U.S. Cl.
CPC ............... *F16H 21/04* (2013.01); *F16H 37/124* (2013.01); *Y10T 74/18896* (2015.01)
USPC ................ 74/89; 74/101; 455/575.4; 49/351; 379/433.12

(58) Field of Classification Search
CPC ....... F16H 21/54; F16H 37/124; F16H 21/04; H04M 1/0237; H04M 1/022; E05Y 2900/606; G06F 1/1624; G06F 1/1616
USPC ............ 74/89, 89.16, 89.17, 98, 99 R, 100.1, 74/101, 110, 107, 406, 412–416, 27, 74/35–55; 455/575.1–575.9, 90.1–90.3, 455/342, 344, 346–350; 720/615, 613, 619, 720/620, 622; 49/351, 1, 28–130, 176; 379/433.12; 296/223; 184/10; 312/223.1–223.6, 294–351, 319.5; 361/679.3, 679.39, 679.01; 220/345.1; 206/468
See application file for complete search history.

(56) References Cited

U.S. PATENT DOCUMENTS

| 1,651,870 | A | * | 12/1927 | Clas | 49/351 |
|---|---|---|---|---|---|
| 1,687,481 | A | * | 10/1928 | Floraday et al. | 74/89.17 |
| 1,747,587 | A | * | 2/1930 | Ledwinka | 49/351 |
| 1,943,359 | A | * | 1/1934 | Ackerman | 49/351 |
| 1,961,507 | A | * | 6/1934 | Nicholson | 74/89.19 |
| 2,006,956 | A | * | 7/1935 | Lazarides | 49/323 |
| 2,017,244 | A | * | 10/1935 | Gudmundsen | 16/200 |
| 2,076,986 | A | * | 4/1937 | Floraday | 74/89.16 |
| 2,080,936 | A | * | 5/1937 | Smith | 49/323 |
| 2,088,098 | A | * | 7/1937 | Susor | 74/414 |
| 2,119,012 | A | * | 5/1938 | Kahn | 126/41 E |
| 2,168,242 | A | * | 8/1939 | Roethel | 49/351 |
| 2,358,319 | A | * | 9/1944 | Dupee | 89/34 |
| 2,701,656 | A | * | 2/1955 | French | 414/545 |
| 3,004,448 | A | * | 10/1961 | Wanlass | 74/548 |
| 3,302,335 | A | * | 2/1967 | Werner | 49/350 |
| 3,508,362 | A | * | 4/1970 | Wright | 49/340 |
| 3,552,061 | A | * | 1/1971 | Hermann | 49/351 |

(Continued)

*Primary Examiner* — William Kelleher
*Assistant Examiner* — Valentin Craciun
(74) *Attorney, Agent, or Firm* — Rosenberg, Klein & Lee (57) ABSTRACT

A synchronous movement-aid device for slide module includes at least one aid device. The aid device includes a first arm, a second arm connected with the first arm and a rotational wheel connected with the second arm and rotatable with the movement of the second arm. The first arm has a pivoted end mounted on a rail. When an external force is applied to the first arm, the pivoted end can freely move along the rail relative to the second arm. The second arm has a fixed end connected to the rotational wheel. When the first arm moves along the rail, the rotational wheel is driven to rotate so as to achieve better synchronous movement effect than the conventional slide mechanism.

27 Claims, 5 Drawing Sheets

(56) References Cited

U.S. PATENT DOCUMENTS

| | | | | |
|---|---|---|---|---|
| 3,712,523 | A | * | 1/1973 | Coffman ................... 224/320 |
| 4,119,341 | A | * | 10/1978 | Cook ...................... 296/146.16 |
| 4,991,252 | A | * | 2/1991 | Budinski .................. 15/250.21 |
| 5,402,737 | A | * | 4/1995 | Kanazawa ................... 108/147 |
| 6,953,442 | B2 | * | 10/2005 | Yamasaki et al. ............... 602/22 |
| 7,019,965 | B2 | * | 3/2006 | Bradley et al. ........... 361/679.38 |
| 7,182,177 | B1 | * | 2/2007 | Simnacher ................... 187/211 |
| 7,322,036 | B2 | * | 1/2008 | Hirano et al. ................. 720/621 |
| 7,822,447 | B2 | * | 10/2010 | Kim ......................... 455/575.4 |
| 7,926,370 | B2 | * | 4/2011 | Kawabuchi et al. ........... 74/22 R |
| 8,605,417 | B2 | * | 12/2013 | Lin et al. .................. 361/679.05 |
| 2003/0112548 | A1 | * | 6/2003 | Hayashi ....................... 360/85 |
| 2003/0167695 | A1 | * | 9/2003 | Regnier et al. .................. 49/351 |
| 2005/0111178 | A1 | * | 5/2005 | Bradley et al. ................ 361/684 |
| 2007/0193398 | A1 | * | 8/2007 | Kawabuchi et al. ........... 74/530 |
| 2008/0229345 | A1 | * | 9/2008 | Shukuya ....................... 720/620 |
| 2008/0232070 | A1 | * | 9/2008 | Kuwajima et al. ............. 361/727 |
| 2010/0113110 | A1 | * | 5/2010 | Lee .......................... 455/575.4 |
| 2010/0177020 | A1 | * | 7/2010 | Bemelmans et al. ............ 345/55 |
| 2010/0291979 | A1 | * | 11/2010 | Jeong et al. ................. 455/575.4 |
| 2012/0325032 | A1 | * | 12/2012 | Hsu ........................... 74/89.22 |
| 2012/0327564 | A1 | * | 12/2012 | Lin et al. .................. 361/679.01 |
| 2013/0155584 | A1 | * | 6/2013 | Chen ...................... 361/679.01 |
| 2013/0174677 | A1 | * | 7/2013 | Hsu et al. ........................ 74/89 |

* cited by examiner

SYNCHRONOUS MOVEMENT-AID DEVICE FOR SLIDE MODULE

BACKGROUND OF THE INVENTION

1. Field of the Invention

The present invention relates generally to a synchronous slide-aid device for electronic apparatus, and more particularly to a synchronous movement-aid device for slide module, which is mounted on a slidable or movable apparatus body. In operation, the synchronous movement-aid device serves to increase the synchronous movement effect and operational stability of the slide device. Accordingly, the problems of elastic fatigue and difficulty in controlling the assembling quality with the conventional transmission belt are overcome.

2. Description of the Related Art

It is known that various freely reciprocally movable or slidable slide cover systems have been developed and applied to different electronic devices such as mobile phones, laptops, PDA, digital imagers and electronic books. The slide cover can be moved and opened/closed.

The above slide cover module or slide cover assembly generally includes a movable frame, a linking board, multiple elastic members, linking wires and guide rails with specific configurations. These components cooperate with each other to help in opening/closing the slide cover. In the case that such slide cover module is applied to a relatively heavyweight electronic product necessitating longer movement distance, when operated, (for example, when a lateral push force is applied to one single side of the slide cover assembly), the slide cover assembly or mechanism tends to shake or deflect to affect the stability of movement of the slide cover assembly.

In order to solve the problem of shake or deflection of the slide cover assembly or mechanism, a slide cover assembly with wires or transmission belt for helping in sliding the slide cover has been developed. In such device, a first transmission unit and a second transmission unit are respectively arranged on two sides of the electronic apparatus. The first and second transmission units are composed of idlers. A transmission belt is wound around the first and second transmission units. When pushing the slide cover module to move, the transmission belt and the first and second transmission units cooperate with each other to keep the slide mechanism synchronously moving so as to avoid deflection or shake of the slide cover module.

In the above slide cover mechanism, the wires or transmission belt is elastic. Therefore, in the cooperative driving process, the transmission of kinetic energy will be delayed. As a result, the slide cover module will still deflect or shake. Especially, after a period of use, the original preset force of the assembled wires or transmission belt will decline due to elastic fatigue. This will lead to deterioration of the synchronous movement effect of the transmission mechanism.

In practice, in case of more serious elastic fatigue of the wires or transmission belt, the wires or transmission belt may detach from the idlers or rollers during sliding operation of the slide cover module. Under such circumstance, the slide device will lose its synchronous movement effect.

Moreover, as well known by those skilled in this field, when assembled, the wires or transmission belt needs to be in a tensioned state. This causes more difficult in controlling the quality in wiring and assembling process. As a result, the ratio of good products can be hardly increased and the assembling time can be hardly shortened. Accordingly, the manufacturing cost for the product is increased.

It is therefore tried by the applicant to provide a synchronous movement-aid device for slide module to overcome the above shortcomings existing in the conventional slide cover module. The synchronous movement-aid device includes specifically designed transmission mechanism and cooperative structures to eliminate the problem of delay of transmission of kinetic energy with the wires or transmission belt. In practice, not only the problem of shake or deflection of the slide cover is solved, but also the synchronous movement effect and operational stability of the slide device are increased.

SUMMARY OF THE INVENTION

It is therefore a primary object of the present invention to provide a synchronous movement-aid device for slide module, which includes at least one aid device. The aid device includes a first arm, a second arm connected with the first arm and a rotational wheel connected with the second arm and rotatable with the movement of the second arm. The first arm has a pivoted end mounted on a rail. When an external force is applied to the first arm, the pivoted end can freely move along the rail relative to the second arm. The second arm has a fixed end connected to the rotational wheel. When the first arm moves along the rail, the rotational wheel is driven to rotate so as to achieve better synchronous movement effect than the conventional slide mechanism.

It is a further object of the present invention to provide the above synchronous movement-aid device for slide module, in which the first arm has at least one shaft or pin member and the second arm is formed with at least one slot corresponding to the shaft or the pin member for detaining the shaft or the pin member therein. The shaft or the pin member is freely movable within the slot.

It is still a further object of the present invention to provide the above synchronous movement-aid device for slide module, in which the first arm includes a left first arm and a right first arm. The second arm includes a left second arm and a right second arm. The rotational wheel includes a left rotational wheel and a right rotational wheel engaged with the left rotational wheel. When a user applies an external force to one single side of a slide module to move the same, the left (or right) first arm and the left (or right) second arms are moved. Via the left rotational wheel (or the right rotational wheel), the right rotational wheel (or the left rotational wheel) is driven to rotate. At this time, the right first arm (or the left first arm) and the right second arm (or the left second arm) are synchronously moved. Accordingly, the problems of delay of transmission of kinetic energy due to elastic fatigue and difficulty in controlling the assembling quality with the conventional wires or transmission belt are overcome.

The present invention can be best understood through the following description and accompanying drawings, wherein:

DETAILED DESCRIPTION OF THE PREFERRED EMBODIMENTS

Figure 1:
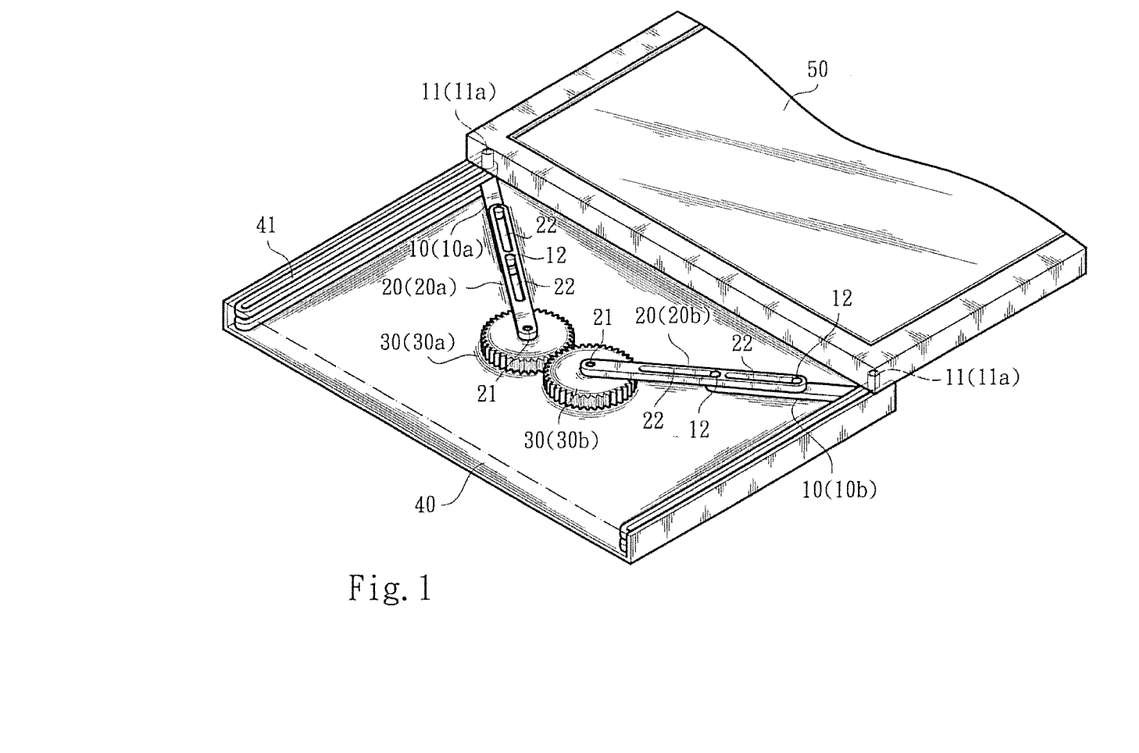
FIG. 1 is a perspective assembled view of the present invention.
Figure 2:
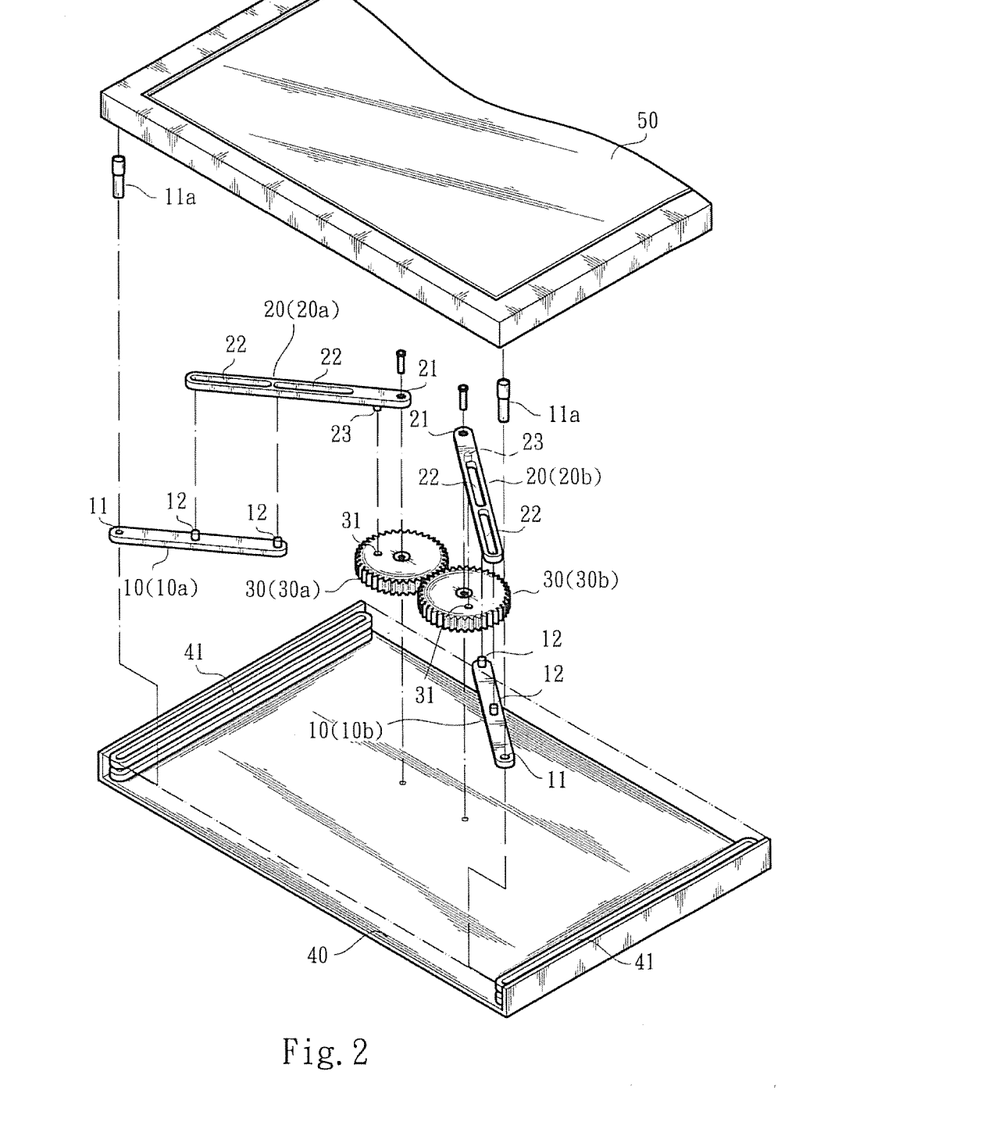
FIG. 2 is a perspective exploded view of the present invention according to FIG. 1.
Figure 2A:
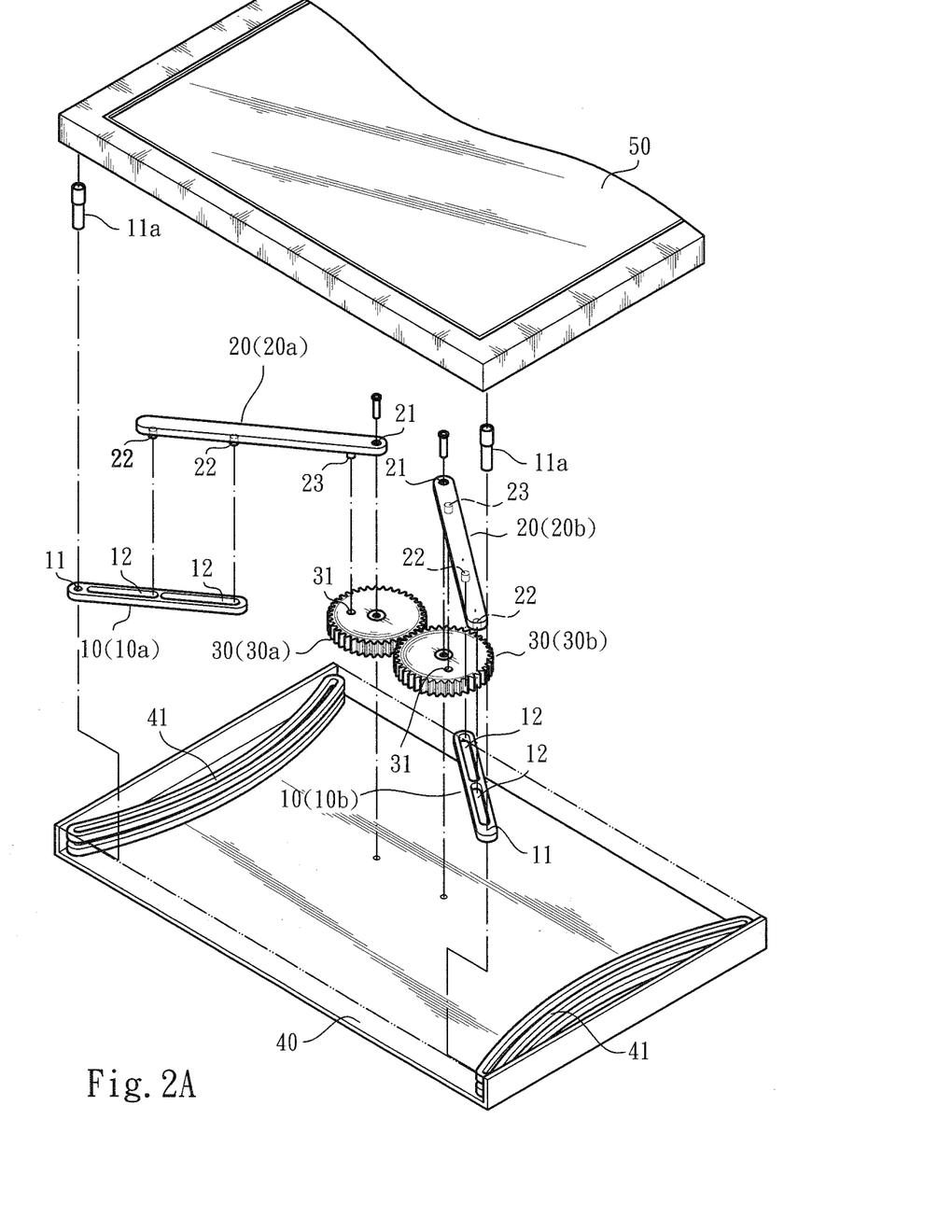

Please refer to FIGS. 1 and 2. The synchronous movement-aid device for slide module of the present invention includes at least one aid device. The aid device includes a first arm 10 and a second arm 20. The second arm 20 is assembled with a rotational wheel 30. The first and second arms 10, 20 and the rotational wheel 30 are mountable on a fixed apparatus body of an electronic apparatus. As shown in the drawings, the first and second arms 10, 20 and the rotational wheel 30 are mounted on a substrate 40 of the fixed apparatus body.

In a preferred embodiment, the first arm 10 includes a left first arm 10a and a right first arm 10b. The second arm 20 includes a left second arm 20a and a right second arm 20b. The rotational wheel 30 includes a left rotational wheel 30a and a right rotational wheel 30b. To speak more specifically, the first and second arms 10, 20 and the rotational wheel 30 are left and right symmetrically arranged. The left rotational wheel 30a is engaged with the right rotational wheel 30b.

Referring to FIGS. 1 and 2, a rail 41 is disposed on each of two sides of the substrate 40. A pivoted end 11 of the first arm 10 (or 10a, 10b) is positioned on the rail 41. In a preferred embodiment, the pivoted end 11 is pivotally connected with the rail 41 or has the form of a pivot pin 11a. When an external force is applied to the linking arm 10, the pivoted end 11 can freely move along the rail 41 relative to the second arm 20 (or 20a, 20b). The second arm 20 (or 20a, 20b) has a fixed end 21 connected with the rotational wheel 30 (or 30a, 30b). When the first arm 10 (or 10a, 10b) moves along the rail 41, the rotational wheel 30 (or 30a, 30b) is driven to rotate. (This will be further described hereinafter).

Further referring to FIGS. 1 and 2, the first arm 10 (or 10a, 10b) has at least one shaft or pin member 12 at the other end opposite to the pivoted end 11. The second arm 20 (or 20a, 20b) is formed with at least one slot 22 corresponding to the shaft or the pin member 12 for detaining the shaft or the pin 12 therein. The shaft or the pin member 12 is permitted to freely move within the slot 22. In this embodiment, the first arm 10 (or 10a, 10b) has two shafts or pin members 12 and the second arm 20 (or 20a, 20b) is formed with two slots 22 for detaining the shafts or the pin members 12 therein respectively.

In a modified embodiment, the first arm 10 (or 10a, 10b) is formed with slots, while the second arm 20 (or 20a, 20b) has shafts or pin members. It should be noted that in both embodiments, the first arm 10 (or 10a, 10b) and the second arm 20 (or 20a, 20b) can move relative to each other to extend and lengthen the connection length or overlap and shorten the connection length.

In the embodiment of FIGS. 1 and 2, the fixed end 21 of the second arm 20 (or 20a, 20b) is connected or affixed to a circular center of the rotational wheel 30 (or 30a, 30b). In a preferred embodiment, the second arm 20 (or 20a, 20b) has a retainer section 23 fixed in a hole or a pit 31 eccentrically formed on the rotational wheel 30 (or 30a, 30b). The retainer section 23 helps in driving the rotational wheel 30 (or 30a, 30b) to rotate when the second arm 20 (or 20a, 20b) moves. In this embodiment, the retainer section 23 has the form of a pile.

In a modified embodiment, a retainer section is eccentrically disposed on the rotational wheel 30 (or 30a, 30b). The retainer section is connected to the second arm 20 (or 20a, 20b).

Figure 3:
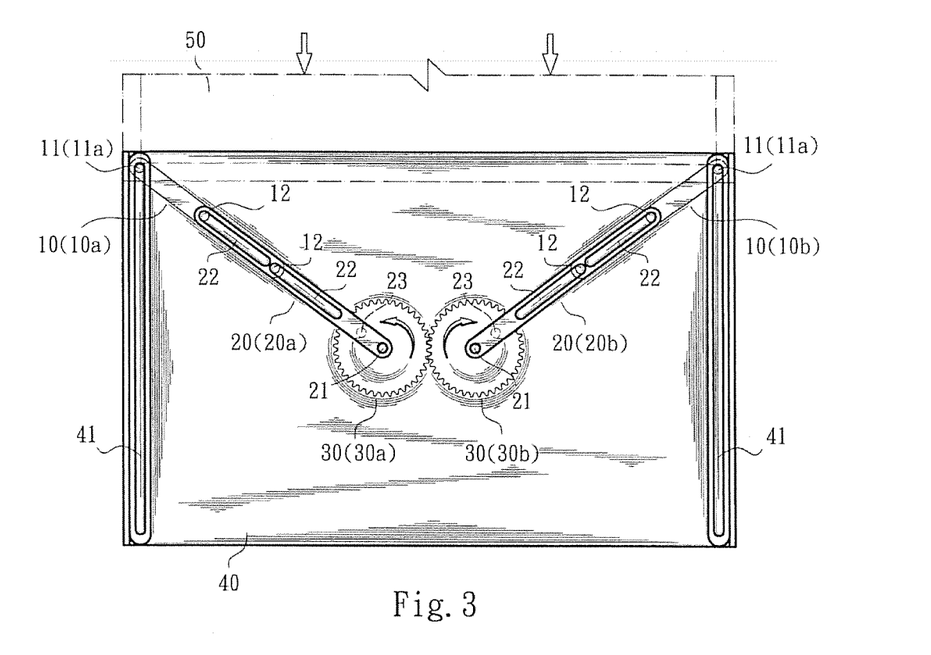
FIG. 3 is a plane view of the present invention according to FIG. 1, in which the rotational wheels rotate in a direction as indicated by the arrows and the movable apparatus body is positioned in an opened position as shown by the phantom line.
Figure 4:
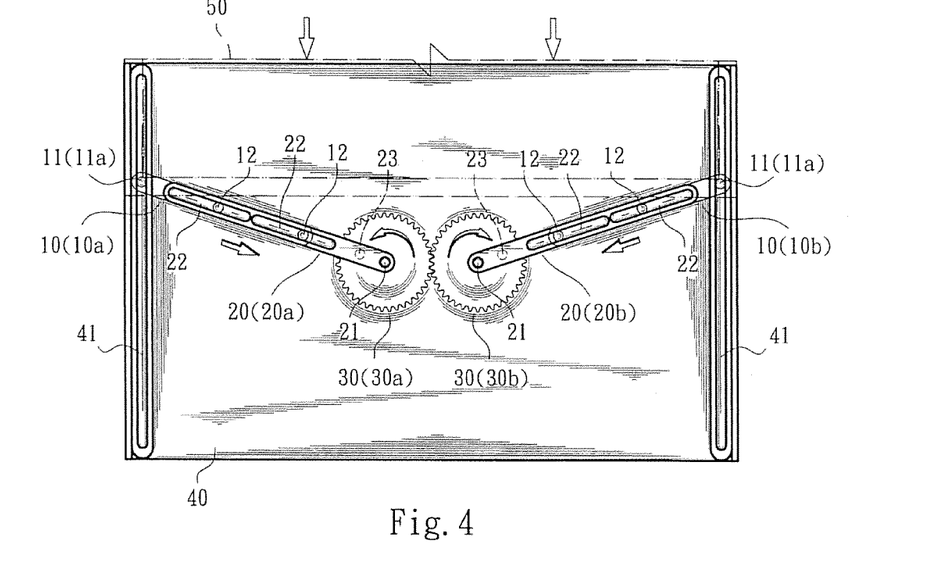
FIG. 4 is a plane view of the present invention according to FIG. 3, showing the operation of the present invention and the movement of the first and second arms, in which the rotational wheels rotate in a direction as indicated by the arrows.

FIGS. 3 and 4 shows the movement of the movable apparatus body 50 (such as a slide module) and the cooperative substrate 40 of the fixed apparatus body. The movable apparatus body 50 is pivotally connected with the pivoted end 11 of the first arm 10 (or 10a, 10b). FIG. 3 shows that the movable apparatus body 50 is positioned in an opened position.

When a user operates the movable apparatus body 50 to move toward a lower side of the drawing, the pivoted end 11 of the first arm 10 (or 10a, 10b) is driven to move along the rail 41 toward the lower side of the drawing. Along with the change of angle and position of the first arm 10 (or 10a, 10b) and the second arm 20 (or 20a, 20b), the shaft or pin member 12 is relatively moved within the slot 22 of the second arm 20 (or 20a, 20b) to shorten the connection length of the first arm 10 (or 10a, 10b) and the second arm 20 (or 20a, 20b) as shown by the arrows of FIGS. 4 and 5.

Figure 5:
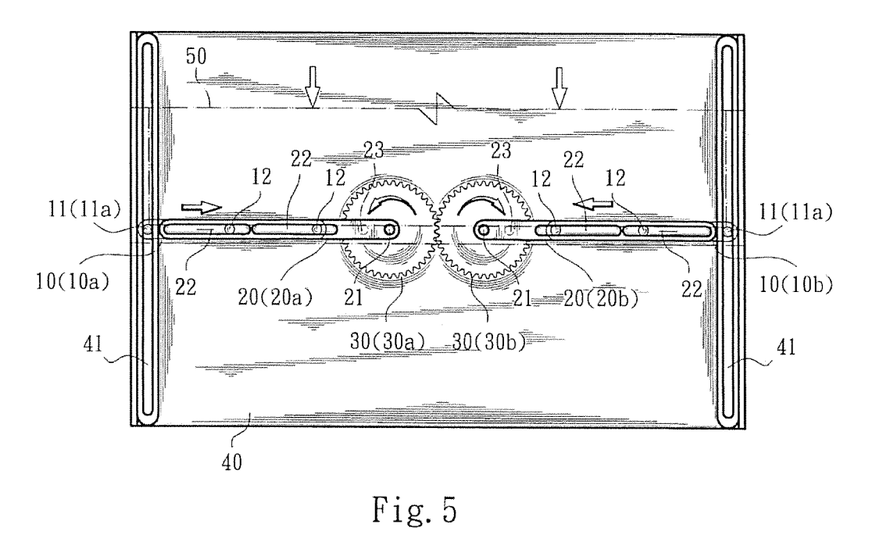
FIG. 5 is still a plane view of the present invention according to FIG. 3, showing the operation of the present invention and the movement of the first and second arms, in which the rotational wheels rotate in a direction as indicated by the arrows.

As shown in FIGS. 3, 4 and 5, when the second arm 20 (or 20a, 20b) relatively moves along with the first arm 10 (or 10a, 10b), the retainer section 23 of the second arm 20 (or 20a, 20b) at the same time drives the rotational wheel 30 (or 30a, 30b) to rotate around the fixed end 21. As shown in the drawings, the left rotational wheel 30a is counterclockwise rotated, while the right rotational wheel 30b is clockwise rotated.

FIG. 5 shows that the first arm 10 (or 10a, 10b) and the second arm 20 (or 20a, 20b) are moved to a position where the first arm 10 (or 10a, 10b) and the second arm 20 (or 20a, 20b) overlap most, that is, a position where the connection length of the first arm 10 (or 10a, 10b) and the second arm 20 (or 20a, 20b) is shortest.

Figure 6:
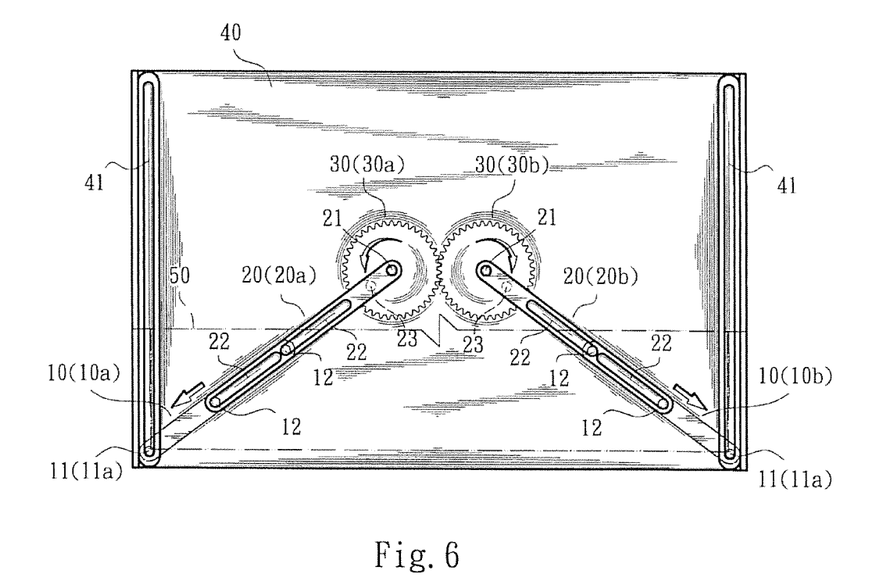
FIG. 6 is still a plane view of the present invention according to FIG. 3, showing the operation of the present invention and the movement of the first and second arms, in which the rotational wheels rotate in a direction as indicated by the arrows and the movable apparatus body is positioned in a closed position as shown by the phantom line.

FIG. 6 shows that the movable apparatus body 50 reaches the end of the rail 41 and is positioned in a closed position. When the movable apparatus body 50 further moves from the position as shown in FIG. 5 to the position as shown in FIG. 6, the distance between the pivoted end 11 of the first arm and the circular center of the rotational wheel 30 is lengthened, whereby the connection length of the first arm 10 (or 10a, 10b) and the second arm 20 (or 20a, 20b) becomes longer until the movable apparatus body 50 or the pivoted end 11 reaches the end of the rail 41 as shown in FIG. 6.

In contrast to FIG. 5, FIGS. 3 and 6 show that the first arm 10 (or 10a, 10b) and the second arm 20 (or 20a, 20b) are positioned in a position where the first arm 10 (or 10a, 10b) and the second arm 20 (or 20a, 20b) overlap least, that is, a position where the connection length of the first arm 10 (or 10a, 10b) and the second arm 20 (or 20a, 20b) is longest.

In the above embodiment, the rails 41 disposed on the substrate 40 have a linear form. In a modified embodiment, the rails 41 have an arcuate or curved form. Along with the movement of the pivoted end 11 of the first arm in such a path, the first arm 10 (or 10a, 10b) and the second arm 20 (or 20a, 20b) can still relatively move along the rails 41 to adjust the connection length of the first arm 10 (or 10a, 10b) and the second arm 20 (or 20a, 20b).

It should be noted that the first arm 10 (or 10a, 10b) and the second arm 20 (or 20a, 20b) and the left and right rotational wheels 30a, 30b together form a rigid assembly. When an external force is applied to one single side of the movable apparatus body 50 to move the same, the left first arm 10*a* (or the right first arm 10*b*) and the left second arm 20*a* (or the right second arm 20*b*) are relatively moved. Via the left rotational wheel 30*a* (or the right rotational wheel 30*b*), the right rotational wheel 30*b* (or the left rotational wheel 30*a*) is driven to rotate. At this time, the right first arm 10*b* (or the left first arm 10*a*) and the right second arm 20*b* (or the left second arm 20*a*) are synchronously moved with the operation of the movable apparatus body 50. This overcomes the problem existing in the conventional device that the slide mechanism can hardly truly synchronously move.

According to the above arrangement, in comparison with the conventional device, the synchronous movement-aid device for slide module of the present invention helps in operating and moving the slide cover module or the movable apparatus body 50 and has the following advantages:

1. The synchronous movement-aid device for slide module of the present invention is advantageous over the conventional device in that along with the change of angle and position, the first arm 10 (or 10*a*, 10*b*) and the second arm 20 (or 20*a*, 20*b*) can relatively move to lengthen or shorten the connection length thereof. The left and right rotational wheels 30*a*, 30*b* are engaged with each other, whereby the first arm 10 (or 10*a*, 10*b*) and the second arm 20 (or 20*a*, 20*b*) can synchronously move. With the above mechanism, the wires or transmission belt and their cooperative mechanisms of the conventional device for transmitting kinetic energy are omitted.
2. The usage of the synchronous movement-aid device for slide module of the present invention is different from the conventional device in that the connection length of the first arm 10 (or 10*a*, 10*b*) and the second arm 20 (or 20*a*, 20*b*) can be lengthened or shortened with the change of their positions. The left and right rotational wheels 30*a*, 30*b* are cooperatively engaged with each other, whereby the left and right first arms 10*a*, 10*b* and the left and right second arms 20*a*, 20*b* can synchronously move. Accordingly, an effective transmission mechanism is provided to overcome the problem of delay of transmission of kinetic energy with the conventional wires or transmission belt. Especially, the synchronous movement-aid device of the present invention solves the problem of shake or deflection with the conventional device and increases the synchronous movement effect and operational stability of the slide mechanism.
3. In the conventional device, after a period of use, the original preset force of the assembled wires or transmission belt will decline due to elastic fatigue. This will lead to deterioration of the synchronous movement effect of the transmission mechanism. In practice, in case of more serious elastic fatigue of the wires or transmission belt, the wires or transmission belt may detach from the idlers or rollers during sliding operation of the slide cover module. Under such circumstance, the slide device will lose its synchronous movement effect. In contrast, in the synchronous movement-aid device of the present invention, the first arm 10 (or 10*a*, 10*b*) and the second arm 20 (or 20*a*, 20*b*) and the left and right rotational wheels 30*a*, 30*b* together form a rigid assembly to overcome the above problems with the conventional device.
4. In the conventional device, when assembled, the wires or transmission belt needs to be in a tensioned state. This causes more difficult in controlling the quality in wiring and assembling process. As a result, the ratio of good products can be hardly increased and the assembling time can be hardly shortened. Accordingly, the manufacturing cost for the product is increased. In contrast, in the synchronous movement-aid device of the present invention, the first arm 10 (or 10*a*, 10*b*) and the second arm 20 (or 20*a*, 20*b*) and the left and right rotational wheels 30*a*, 30*b* together form a rigid assembly. Such structure is simple and the assembling process is easy to perform.

The above embodiments are only used to illustrate the present invention, not intended to limit the scope thereof. Many modifications of the above embodiments can be made without departing from the spirit of the present invention.

What is claimed is:

1. A synchronous movement-aid device for slide module, comprising a pair of aid devices correspondingly arranged on opposing sides of a substrate, each aid device including:
    a first arm having first and second displaced pin members fixedly secured to said first arm;
    a second arm having first and second slots formed therethrough for receipt of said first and second pin members of said first arm for linear displacement of said first arm with respect to said second arm, said first and second arms mounted in overlapping relation each to the other; and
    a rotational wheel connected with the second arm and rotatable responsive to angular displacement of the second arm,
    the rotational wheels of each aid device are matingly engaged and the second arms are angularly displaceable in opposing angular directions to drive the rotational wheels to rotate in opposing directions with respect to one another.

2. The synchronous movement-aid device for slide module as claimed in claim 1, wherein the first and second arms and the rotational wheel are mounted on the substrate.

3. The synchronous movement-aid device for slide module as claimed in claim 1, wherein the first arm includes a left first arm and a right first arm, the second arm includes a left second arm and a right second arm, the rotational wheel includes a left rotational wheel and a right rotational wheel, the left rotational wheel being engaged with the right rotational wheel.

4. The synchronous movement-aid device for slide module as claimed in claim 2, wherein a rail is disposed on the substrate and the first arm has a pivoted end freely movably positioned on the rail.

5. The synchronous movement-aid device for slide module as claimed in claim 3, wherein a rail is disposed on each of two sides of the substrate, each of the left and right first arms having a pivoted end freely movably positioned on the rail.

6. The synchronous movement-aid device for slide module as claimed in claim 4, wherein the pivoted end has a pivot pin.

7. The synchronous movement-aid device for slide module as claimed in claim 5, wherein the pivoted end has a pivot pin.

8. The synchronous movement-aid device for slide module as claimed in claim 1, wherein the second arm has a fixed end connected to the rotational wheel.

9. The synchronous movement-aid device for slide module as claimed in claim 2, wherein the second arm has a fixed end connected to the rotational wheel.

10. The synchronous movement-aid device for slide module as claimed in claim 3, wherein the second arm has a fixed end connected to the rotational wheel.

11. The synchronous movement-aid device for slide module as claimed in claim 4, wherein the first arm has at least one shaft or pin member at the other end opposite to the pivoted end.

12. The synchronous movement-aid device for slide module as claimed in claim 5, wherein the first arm has at least one shaft or pin member at the other end opposite to the pivoted end.

13. The synchronous movement-aid device for slide module as claimed in claim 8, wherein the fixed end of the second arm is pivotally connected to a circular center of the rotational wheel.

14. The synchronous movement-aid device for slide module as claimed in claim 1, wherein the second arm has a retainer section eccentrically affixed to the rotational wheel.

15. The synchronous movement-aid device for slide module as claimed in claim 2, wherein the second arm has a retainer section eccentrically affixed to the rotational wheel.

16. The synchronous movement-aid device for slide module as claimed in claim 3, wherein the second arm has a retainer section eccentrically affixed to the rotational wheel.

17. The synchronous movement-aid device for slide module as claimed in claim 14, wherein the retainer section has a protrusion formed thereon, a hole or a pit being eccentrically formed on the rotational wheel, the retainer section being fixed in the hole or the pit.

18. The synchronous movement-aid device for slide module as claimed in claim 1, wherein a retainer section is eccentrically disposed on the rotational wheel, the retainer section being connected to the second arm.

19. The synchronous movement-aid device for slide module as claimed in claim 2, wherein a retainer section is eccentrically disposed on the rotational wheel, the retainer section being connected to the second arm.

20. The synchronous movement-aid device for slide module as claimed in claim 3, wherein a retainer section is eccentrically disposed on the rotational wheel, the retainer section being connected to the second arm.

21. The synchronous movement-aid device for slide module as claimed in claim 18, wherein the retainer section has a protrusion formed thereon.

22. The synchronous movement-aid device for slide module as claimed in claim 4, wherein a movable apparatus body is pivotally connected with the pivoted end of the first arm.

23. The synchronous movement-aid device for slide module as claimed in claim 5, wherein a movable apparatus body is pivotally connected with the pivoted end of the first arm.

24. The synchronous movement-aid device for slide module as claimed in claim 4, wherein rails have a linear form.

25. The synchronous movement-aid device for slide module as claimed in claim 5, wherein rails have a linear form.

26. The synchronous movement-aid device for slide module as claimed in claim 4, wherein the rails have an arcuate or curved form.

27. The synchronous movement-aid device for slide module as claimed in claim 5, wherein the rails have an arcuate or curved form.

\* \* \* \* \*